No. 773,541. PATENTED NOV. 1, 1904.
W. BUNTING, Jr.
SHOWER BATH APPARATUS.
APPLICATION FILED OCT. 12, 1903.
NO MODEL. 2 SHEETS—SHEET 1.
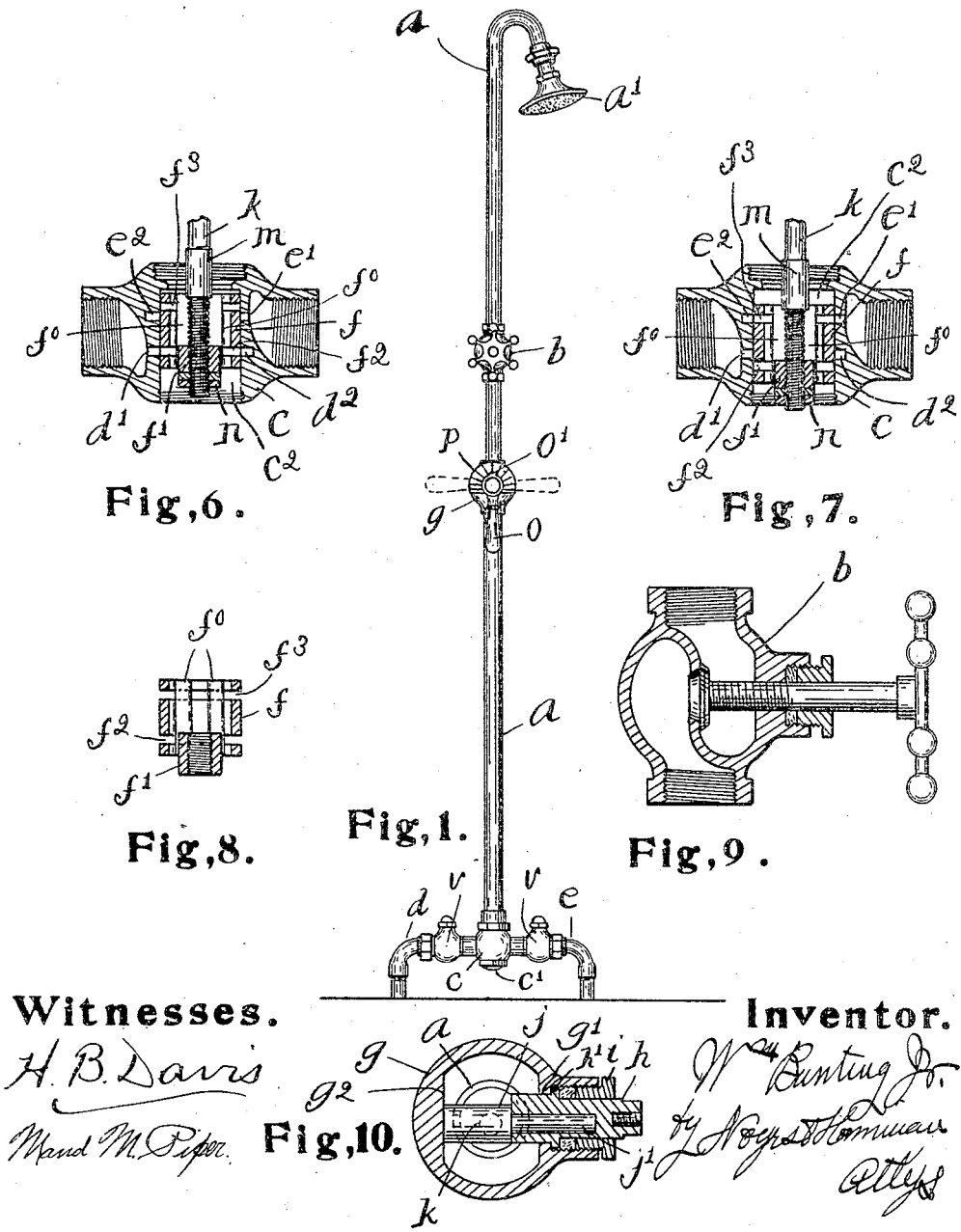

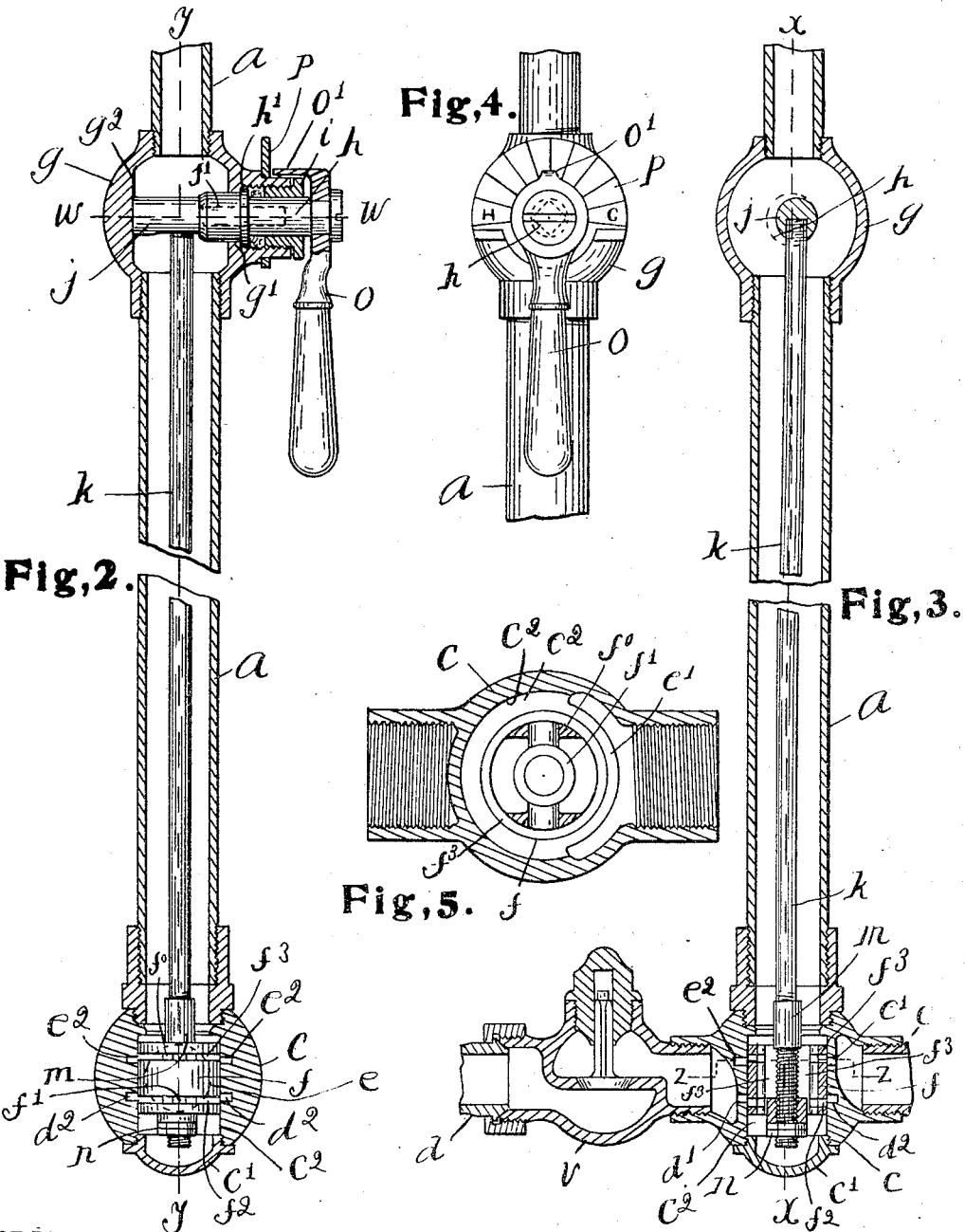

No. 773,541. Patented November 1, 1904.

UNITED STATES PATENT OFFICE.

WILLIAM BUNTING, JR., OF BROOKLINE, MASSACHUSETTS.

SHOWER-BATH APPARATUS.

SPECIFICATION forming part of Letters Patent No. 773,541, dated November 1, 1904.

Application filed October 12, 1903. Serial No. 176,579. (No model.)

*To all whom it may concern:*

Be it known that I, WILLIAM BUNTING, Jr., of Brookline, county of Middlesex, State of Massachusetts, have invented an Improvement in Shower-Bath Apparatus, of which the following description, in connection with the accompanying drawings, is a specification, like characters on the drawings representing like parts.

This invention relates to an apparatus which is especially adapted to be used in shower-baths in which water is discharged through a spraying pipe or nozzle, the apparatus being connected to independent hot and cold water supplying pipes, so that the temperature of the water discharged may be varied at will. In an apparatus of this character considerable difficulty is often experienced in so adjusting the relative supply of hot and cold water to the mixing-pipe as to raise the temperature of the water therein to but not above the desired point, it often being necessary to adjust the relative areas of the hot and cold water ports to a high degree of nicety, particularly when the water is delivered at a high pressure or the hot water at a high degree of temperature. Moreover, it often happens that the water-pressure in one of the supply-pipes is materially reduced or increased without corresponding variation in the other supply-pipe after the desired adjustment has been secured, so that the relative volume of water discharged from the cold and hot water pipes into the mixing-pipes is correspondingly varied, thereby often making the discharged water uncomfortably hot or cold and necessitating a readjustment of one or both of the valves which control the hot and cold water supply.

The object of my invention is to provide an apparatus of the character above referred to with an automatically-operating thermostatic device, which is so constructed and arranged that a lever or other controlling means connected thereto may be set in positions corresponding to the temperatures at which it is desired that the water be discharged and so that when the water flows through the mixing-chamber the quantity of hot and cold water which is supplied thereto will be automatically proportioned to produce a mixture at approximately the temperature desired, rendering further adjustment of the controlling means unnecessary, even if the conditions of temperature and pressure under which the hot and cold water is supplied are different at one time than at another, said thermostatic device being further adapted to prevent material variations in temperature of the water in the mixing-pipe by reason of variations in temperature and pressure in either of the water-supplying pipes, and thereby to prevent scalding of the bather.

Further objects of my invention are to provide a shower-bath apparatus which is simple in construction and sightly in appearance and which may be readily and conveniently controlled by the user. I accomplish this object by the means hereinafter described, and illustrated in the accompanying drawings, in which—

Figure 1 is a front elevation of a shower-bath apparatus provided with my invention. Fig. 2 is a central vertical section view on the line $x\ x$ of Fig. 3 of a thermostatic device made according to my invention. Fig. 3 is a similar view on the line $y\ y$ of Fig. 2. Fig. 4 is an enlarged detail view of the controlling-handle. Fig. 5 is an enlarged detail view on the line $z\ z$ of Fig. 3. Figs. 6 and 7 are sectional views of the controlling-valve, showing different positions thereon; and Fig. 8 is a detail sectional view thereof. Fig. 9 is a similar view of the discharge-valve. Fig. 10 is a sectional view on the line $w\ w$ of Fig. 2.

A vertical mixing-pipe $a$, preferably of iron or some other metal which is suitable for the purpose and has a low coefficient of linear expansion, is provided, said pipe having a shower-bath nozzle or rose $a'$ at its upper end. An ordinary globe or shut-off valve $b$, such as is shown in detail in Fig. 10, is provided at a convenient point in said pipe. The lower end of the pipe $a$ is connected to one part of a three-way-valve casing $c$, and a hot-water-supply pipe $d$ and a cold-water-supply pipe $e$ are connected to the other ports of said casing, respectively. Said casing $c$ is provided with a vertically-extending centrally-arranged cylindrical bore $c^2$, which is closed at the lower end by a cap $c'$ and is in line with pipe $a$ and continuous with the port with which said pipe is connected. A narrow port $d'$ is provided in the walls of said casing between the hot-water pipe $d$ and said central bore $c^2$, and a similar port $e'$ is provided between the cold-water pipe $e$ and said bore, the port $e'$ being arranged opposite and above the port $d'$, as shown. An internal annular groove $d^2$ is formed in the walls of the central bore $c^2$, at right angles thereto and continuous with the port $d'$, and a similarly-arranged groove $e^2$ is also provided in said walls, which is continuous with the port $e'$. A cylindrical controlling valve-body $f$ is fitted in the bore $c^2$, said valve preferably being made hollow from end to end and having internal ribs $f^0$, which extend from top to bottom thereof, and a bridge $f'$, all formed integrally with said valve-body, said bridge having a centrally-arranged screw-threaded aperture therethrough. Ports $f^2$ and $f^3$ are formed in said cylindrical valve by cutting annular slots through the walls thereof, so that said ports extend entirely around the same and are connected to the interior thereof between each rib $f^0$. By this arrangement of ports and passages I am enabled to secure a considerable variation in area of said inlet-ports with a comparatively small movement of said valve $f$. By providing ports in the valve-body instead of having the ends thereof act to close the ports in the casing the body is more perfectly guided and leakage is in a greater measure prevented. Moreover, by providing the annular grooves in the casing the pressure of the water from either source at opposite sides of the valve $f$ is equalized, thereby preventing binding of the valve under all conditions.

The ports $f^2$ and $f^3$ are of the same width as the ports $d'$ $e'$ and the annular grooves $d^2$ $e^2$, and the port $f^2$ is so arranged with relation to the port $f^3$ that it will be exactly in register with the port $d'$ and groove $d^2$ when the port $f^3$ is just out of register with the port $e'$ and groove $e^2$, as shown in Fig. 6, and vice versa, as shown in Fig. 7. With this arrangement, therefore, when the cylindrical valve $f$ is moved downwardly from the position shown in Fig. 6 the area of the hot-water port will be reduced and the area of the cold-water port will be correspondingly increased and, vice versa when the valve is moved upward from the position in Fig. 7.

A check-valve $v$ of suitable form is provided in both of said pipes $d$ and $e$, each valve $v$ being arranged to prevent backflow in said pipes, so that if the water-pressure should be greater in one supply-pipe than in the other there will be no flow from one to the other.

A shaft $h$ passes through the wall of said casing $g$ at right angles to the pipe $a$ and is rotatably mounted in a stuffing-box $i$, arranged in a recess in the wall of the casing, said shaft having an annular flange $h'$, which bears against a seat $g'$, formed therefor at the inner end of said recess. The inner end portion of said shaft extends within the casing $g$ and is provided with a longitudinally-extending bore or recess arranged eccentrically with relation to the axis of the shaft. A lifting-bar $j$ is arranged in line with said shaft $h$ and is provided with an extension $j'$, preferably of smaller diameter, the latter being fitted in the eccentrically-arranged recess of the rod $h$. The opposite end of said bar $j$ from said extension is flat and bears against a vertically-extending flat surface $g^2$, formed on the inner side of the casing $g$.

A composition valve-stem $k$, having a high coefficient of lineal expansion and much greater than that of pipe $a$, is secured at one end to the bar $j$, at right angles thereto, and extends downwardly in the pipe $a$ and concentrically therewith, its lower end being secured in a socket formed in the upper end of a stem $m$, the latter being threaded into the central hole through the bridge $f'$, so that a considerable range of adjustment is provided for valve $f$ upon said stem $m$, lock-nuts $n$ being provided on the lower end of said stem for holding the valve in the position to which it may be adjusted.

A handle $o$ is secured to the outer end of the shaft $h$, with which said shaft may be rotated, and said handle is preferably provided with a pointer $o'$, and a semicircular graduated dial $p$ is mounted adjacent said pointer, one end of the dial being preferably marked "C" to indicate cold water and the other marked "H" to indicate hot water, the intermediate portion thereof preferably being graduated and numbered to indicate different degrees of temperature.

The eccentrically-arranged bore of shaft $h$ is so arranged with relation to the handle $o$ that when the latter is thrown to a horizontal position with its pointer at "C," or indicating the position for cold water, the center line of extension $j'$ of the bar $j$ will be directly below the axis of shaft $h$ and when the handle is thrown to the opposite position with the pointer at "H" the center line of said extension will be directly above said axis. In moving said shaft from one position to the other it will be evident that the bar $j$ will be raised a vertical distance equal to twice the distance between said center line and said axis, and this distance is preferably equal to the width of said ports $d'$ and $e'$, so that when the handle is moved from the position at "C" to the position at "H" the valve $f$ may be moved from the position of Fig. 7, where the cold-water port is fully open and the hot-water port is completely closed, to the reverse position of Fig. 6.

The length of the expansion-rod $k$ and the coefficient of expansion thereof with relation to that of the pipe *a* between casings *g* and *e* is such that a variation in temperature of the water in pipe *a* of from 70° to 110° or 115° Fahrenheit will be sufficient to cause said rod to expand to such an extent as to move the valve *f* a distance equal to the width of the ports which it controls, or from the position of Figs. 6 to 7, or vice versa. Furthermore, the valve *f* is adjusted to such a position on its stem that when the pointer of the handle *o* is at "H" and the temperature of the water in pipe *a* reaches 110° or 115° Fahrenheit the rod *k* will expand sufficiently to move the valve *f* to the position of Fig. 7, completely closing the hot-water port, and thereby preventing all possibility of the temperature being raised above this point and of scalding the user in case the cold-water supply should fail.

In case the hot-water supply should fail or fall below 70° when the handle is set at "H" the rod *k* will immediately contract until the cold-water port is completely closed and the hot-water port is fully open.

Assuming that under normal conditions the hot water is at 150° and the cold water at 65°, with the pressures equal, if it is desired to have water at a medium temperature, such as 80° Fahrenheit, discharged through the shower-nozzle the pointer *o'* will be moved to a predetermined corresponding intermediate position on the dial, and then the valve *b* will be opened, permitting the water to flow through either the cold or hot water port, or both, and if the temperature of the water in the mixing-pipe *a* should be below the desired temperature the rod *k* will contract, moving valve *f* upwardly, thus decreasing the size of the cold-water port and increasing the size of the hot-water port correspondingly until the temperature of the water in the mixing-pipe has been raised to the desired extent, or in case the water in the mixing-pipe should be too hot the opposite action would take place. If the temperature of the hot water should fall, the temperature of the water in the mixing-pipe will also fall, causing the rod *k* to contract, thereby moving the valve *f* so that the area of the hot-water port is increased and that of the cold-water port is diminished and raising the temperature of the mixture approximately to what it was before, notwithstanding the variation in temperature of the hot water. In like manner if the pressure of the water in the cold-water pipe should fall, so that the volume of water flowing through the cold-water port in a given time was reduced, then the temperature in the mixing-pipe would be raised, thus causing the rod *k* to expand and increasing the area of the cold-water port and correspondingly decreasing that of the hot-water port, approximately restoring the former conditions.

Having thus described my invention, what I claim as new, and desire to secure by Letters Patent, is—

1. In an apparatus of the character described, a mixing-chamber having two inlet-ports and a discharge-port, hot, and cold water supplying pipes connected to said inlet-port, thermostatic means for automatically varying the areas of said inlet-ports according to the temperature of the water in said mixing-chamber, and hand-operated means for adjusting said thermostatic means and correspondingly varying the relative areas of said inlet-ports simultaneously, substantially as described.

2. An apparatus of the character described, comprising a valve-casing having two inlet-ports and a discharge-port, hot, and cold water supplying pipes connected to said inlet-ports, respectively, and a mixing-pipe connected to said discharge-port, a valve movable to close either inlet-port, and slidable in opposite directions to increase the area of one port, and decrease the area of the other, thermostatic means for automatically varying the position of said valve according to the temperature of the water in the mixing-pipe, and hand-operated means for correspondingly adjusting said thermostatic means and said valve simultaneously, substantially as described.

3. An apparatus of the character described, comprising a valve-casing having two inlet-ports and a discharge-port, hot, and cold water supplying pipes connected to said inlet-ports, respectively, and a mixing-pipe connected to said discharge-port, a valve movable in opposite directions to close one inlet-port and open the other, and vice versa, an adjusting-handle mounted in said mixing-pipe, a rod arranged in and having a different coefficient of linear expansion than said pipe, said rod being connected at one end to said valve, and at the other end to said handle, and arranged to enable said valve to be set in either closed position, or in an intermediate position, substantially as described.

4. An apparatus of the character described, comprising a valve-casing having two inlet-ports and a discharge-port, hot, and cold water supplying pipes connected to said inlet-ports, respectively, and a mixing-pipe connected to said discharge-port, a valve arranged to close partially each of said inlet-ports simultaneously, and slidable in opposite directions to increase the area of one port and decrease the area of the other, an adjusting-handle mounted in said mixing-pipe, a thermostatic rod arranged in and having a greater coefficient of linear expansion than said pipe, said rod being connected at one end to said valve and at the other end to said handle, substantially as described.

5. An apparatus of the character described, comprising a valve-casing having two inlet-ports and a discharge-port, hot, and cold water supplying pipes connected to said inlet-ports, respectively, and a mixing-pipe connected to said discharge-port, a valve arranged to close partially each of said inlet-ports simultaneously, and slidable in opposite directions to increase the area of one port and decrease the area of the other, an adjusting-handle mounted in said mixing-pipe, a thermostatic rod arranged in and having a greater coefficient of linear expansion than said pipe, said rod being connected at one end to said valve and at the other end to said handle, and a shut-off valve in said mixing-pipe at the opposite side of said adjusting-handle from said valve-casing, substantially as described.

6. In combination with a valve-casing having a reciprocating valve-body therein, a valve-stem connected at one end to said valve-body, a discharge-pipe connected to said casing and in which said stem is arranged, a transversely-extending operating-shaft rotatably mounted in the walls of said pipe, and having a longitudinally-extending eccentrically-arranged recess in the inner end thereof, and a lifting-bar rotatably mounted in said recess and connected to the other end of said rod, substantially as described.

7. In combination with a valve-casing having a cylindrical bore, a cylindrical valve-body fitted to slide in said bore, said body having a longitudinally-extending internal waterway and an annular port extending about it and leading to said waterway at opposite points, said casing having a port leading through its wall to its bore and having an internal annular groove extending from said bore, connected to said port and arranged to register with the port of said body, substantially as described.

In testimony whereof I have signed my name to this specification in the presence of two subscribing witnesses.

WM. BUNTING, Jr.

Witnesses:
LOUIS H. HARRIMAN,
H. B. DAVIS.